United States Patent [19]

Shimmell

[11] Patent Number: 5,465,575
[45] Date of Patent: Nov. 14, 1995

[54] TORQUE CONVERTER AND METHOD FOR PRODUCING THE SAME

[75] Inventor: Dennis S. Shimmell, Hudsonville, Mich.

[73] Assignee: Nelson Metal Products Corporation, Grandville, Mich.

[21] Appl. No.: 305,606

[22] Filed: Sep. 14, 1994

[51] Int. Cl.⁶ .................. F16D 33/00; B23P 15/02
[52] U.S. Cl. .................. 60/345; 60/362; 416/180; 416/197; 29/889.5
[58] Field of Search ................. 60/330, 341, 345, 60/361, 362; 29/889.5, 889.2; 416/180, 197 C, 189, 244, 212 R

[56] References Cited

U.S. PATENT DOCUMENTS

| | | | |
|---|---|---|---|
| 1,096,079 | 5/1914 | Viall | 416/212 |
| 2,473,185 | 6/1949 | Weiss | 416/180 |
| 5,083,904 | 1/1992 | Masatsugu et al. | 416/212 R |
| 5,109,604 | 5/1992 | Koebele | 416/180 X |
| 5,113,654 | 5/1992 | Sahashi | 416/197 C X |

FOREIGN PATENT DOCUMENTS 2717404  11/1977  Germany ................ 29/889.2

OTHER PUBLICATIONS

William Husselbee, "Automatic Transmission—Fundamentals and Service," 2nd edition, Prentice Hall, 1986.

Primary Examiner—Edward K. Look
Assistant Examiner—Hoang Nguyen
Attorney, Agent, or Firm—Warner Norcross & Judd

[57] ABSTRACT

A torque converter having an impeller, turbine, and stator each formed of interconnecting upper and lower members, and a method for producing the same. The upper and lower members each include a number of spaced apart blades disposed about a central axis. Preferably, the corresponding upper and lower members are die cast with blades spaced apart at twice the distance desired in the completed assembly. When the upper and lower members are interconnected, their blades nest such that each member provides every other blade of the assembled component.

21 Claims, 4 Drawing Sheets

TORQUE CONVERTER AND METHOD FOR PRODUCING THE SAME

BACKGROUND OF THE INVENTION

The present invention pertains to fluid clutch devices; and more particularly to fluid couplings and torque converters, and a method for producing the same.

In a typical automobile having an automatic transmission, a fluid coupling or torque converter is used to transfer power from the engine to the transmission. A typical fluid coupling includes in its general organization an impeller 12 linked to the crankshaft 13 of the engine and a turbine 14 linked to the input shaft 15 of the transmission (See FIG. 1). The impeller 12 and turbine 14 are mounted face-to-face within a common housing that is filled with a fluid. Both the impeller and turbine include a series of vanes or blades that rotate about a central axis. When viewed along a plane perpendicular to the axis of rotation, as shown in FIG. 1, the impeller 12 and turbine 14 each resemble one half of a donut. As the engine operates, the crankshaft rotates the impeller, thereby causing the fluid contained in the housing to circulate. The moving fluid strikes the blades of the turbine, eventually causing it to rotate. The rotating turbine in turn imparts rotational movement to the input shaft of the transmission.

A torque converter differs from a fluid coupling in that it not only transfers, but also multiplies torque. In a typical fluid coupling, the circulating fluid returning from the turbine strikes the blades of the impeller at an angle that impedes its rotation. This reduces the efficiency of the coupling. A torque converter, on the other hand, includes a stator 16 rotatably positioned between the turbine 12 and impeller 14 to control the flow of returning fluid (See FIG. 2). The stator 16 includes a series of blades that redirect the fluid to strike the blades of the impeller at an angle that promotes rotation of the impeller. Accordingly, some of the energy of the moving fluid is returned to the impeller.

Fluid couplings and torque converters are typically produced through a complex manufacturing and assembling process. Generally, the impeller, turbine, and stator are produced by assembling a collection of independently manufactured blades on an appropriate support structure. The large number and complex profile of the blades makes this process both expensive and time consuming. As a result of the close proximity of the blades, fluid couplings and torque converters could not previously be manufactured through conventional die casting techniques.

SUMMARY OF THE INVENTION

The aforementioned problems are overcome by the present invention wherein a torque converter having components formed of individual interlocking upper and lower members is provided. The upper and lower members each include a number of vanes or blades that nest to provide a component of the desired configuration. The present invention also provides a method for manufacturing the disclosed torque converter by die casting the upper and lower members of each component.

A torque converter according to the present invention generally includes an impeller, turbine, and stator. The upper and lower members of each component include a plurality of radially symmetric blades spaced apart twice the distance desired in the assembled component. The blades of the upper and lower members nest together such that each member provides every other blade in the assembled component.

As noted above, the present invention further provides a method for manufacturing the disclosed torque converter. In general, the method includes (1) die casting separate upper and lower members for each component, each member having a plurality of radially symmetric blades spaced apart twice the distance desired in the assembled component, (2) assembling the upper and lower members of each component such that the blades of the upper member nest midway between the blades of the lower member, and (3) assembling the components within a conventional housing. Because the upper and lower members each include only every other blade of the assembled component, there is sufficient distance between the blades to permit die casting.

The present invention provides a simple and effective torque converter that may be manufactured through conventional die casting techniques and apparatus; thereby, lowering the cost of manufacture and assembly. While described in connection with a torque converter, the methods and principles disclosed herein are equally applicable to other fluid clutch devices, such as a fluid coupling.

These and other objects, advantages, and features of the present invention will be more fully understood and appreciated by reference to the detailed description of the preferred embodiment and the drawings.

DETAILED DESCRIPTION OF THE PREFERRED EMBODIMENT

Figure 3:
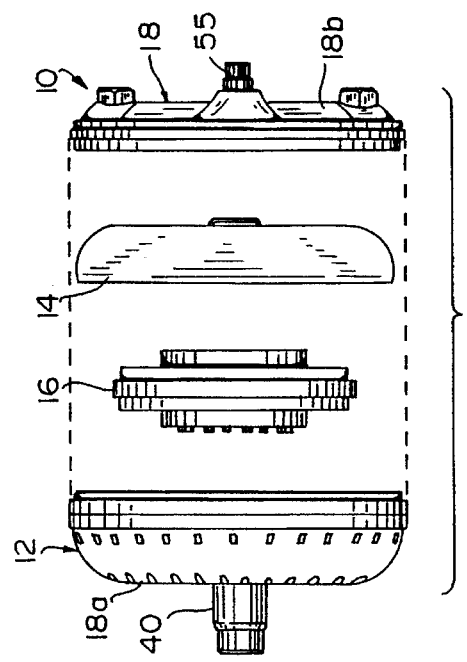
FIG. 3 is an exploded perspective view of a torque converter.

By way of disclosure, and not by way of limitation, an exploded view of a torque converter according to the present invention is illustrated in FIG. 3, and generally designated 10. The torque converter 10 includes in its general organization an impeller 12, a turbine 14, and a stator 16, each housed within a common housing 18 that is filled with a fluid, such as automatic transmission fluid.

Figure 2:
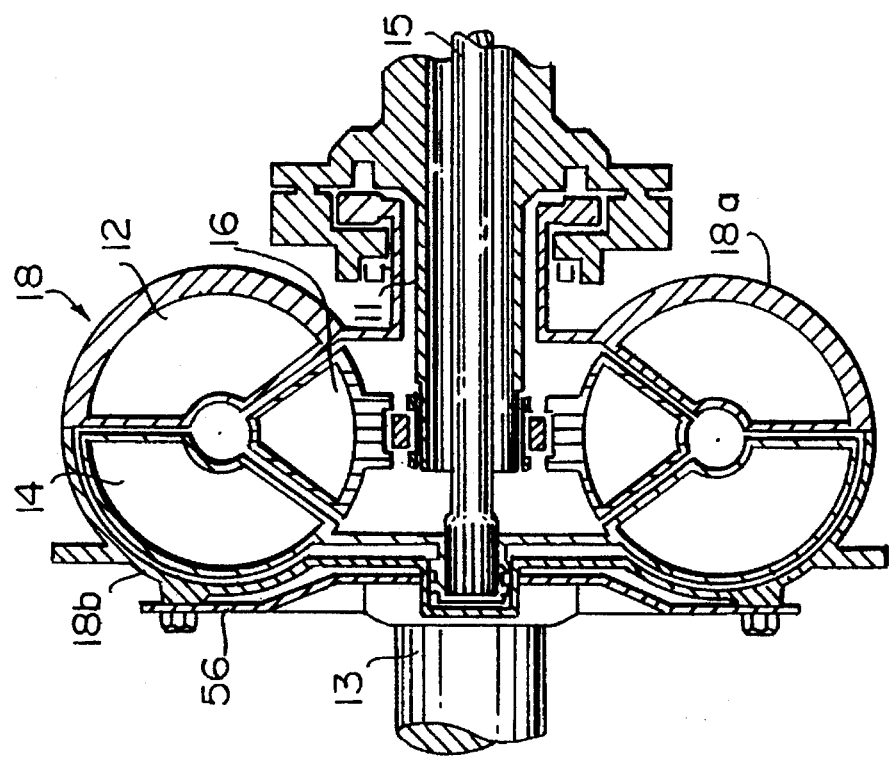
FIG. 2 is a cut view of a torque converter of the prior art.
Figure 1:
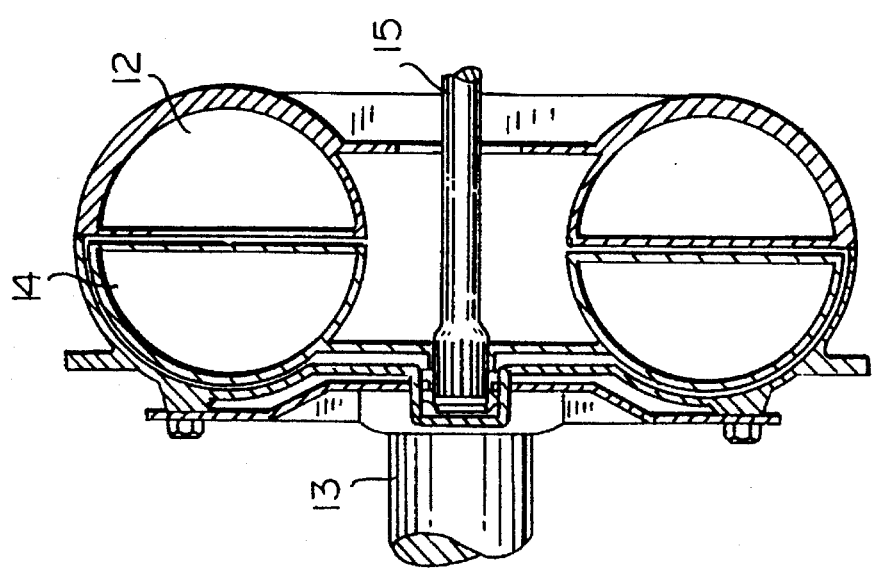
FIG. 1 is a cut view of a fluid coupling of the prior art.

As shown in FIG. 2, the impeller 12 is typically connected to the crankshaft 13 so that rotation of the crankshaft 13 is transferred directly to the impeller 12. Rotational movement of the impeller forces the fluid sealed within the housing to circulate. As should be readily apparent, the volume of fluid circulated by the impeller 12 is proportional to the speed of the engine. The circulating fluid flows from the impeller 12 to the turbine 14. The input energy of the moving fluid transfers the torque of the impeller 12 to the turbine 14. When a sufficient volume of fluid is circulated by the impeller 12, the turbine 14 will rotate. The turbine 14 is connected directly to the input shaft 15 of the transmission so that rotation of the turbine 14 is transferred directly to the transmission. Next, the circulating fluid flows from the turbine 14 back to the impeller 12 through the stator 16. The stator 16 redirects the fluid so that it strikes the impeller 12 at an angle which promotes rotation of the impeller 12.

Figure 4:
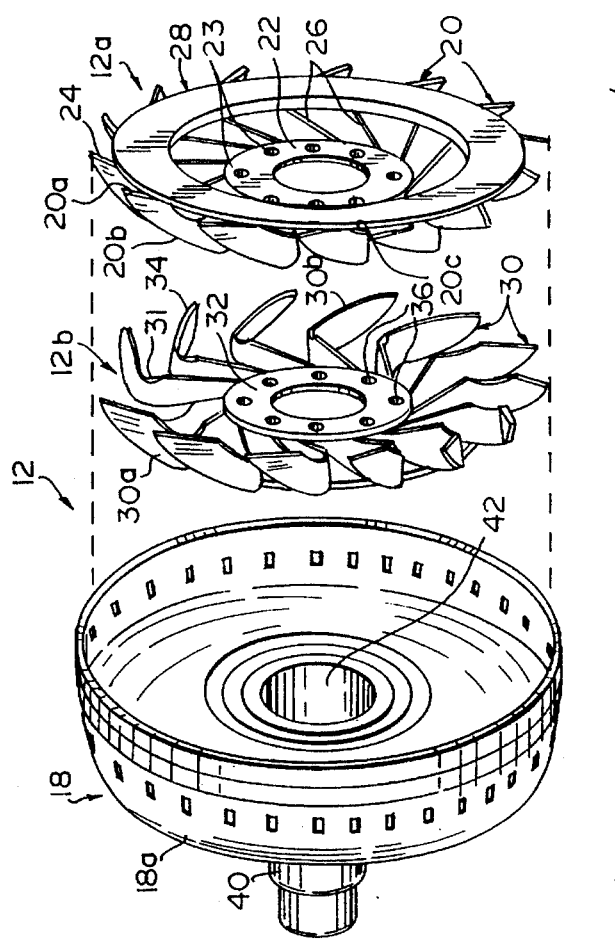
FIG. 4 is an exploded perspective view of the impeller of the present invention.

As perhaps best illustrated in FIG. 4, the impeller 12 includes upper and lower members 12a and 12b that interlock with one another, and mount directly to the first half of the housing 18a, as will be discussed in greater detail below. The upper member 12a includes a plurality of radially symmetric curved blades 20 or vanes extending radially outward from a central ring 22. The central ring 22 preferably includes a plurality of radially symmetric mounting holes 23 for interconnecting the various components of the impeller 12 by rivets or other conventional fastening means. The blades 20 are somewhat semi-circular and have distal and proximate edges 20a and 20b. As shown in FIG. 4, the proximate edge 20b is generally arcuate. The profile of the distal edge 20a is relatively complex. A first outer portion 24 of the distal edge 20a is generally flat such that the outer portions 24 of the blades 20 cooperate to define a plane perpendicular to the impeller's axis of rotation. An arcuate notch 20c is formed in a central portion of the distal edge 20a immediately adjacent to outer portion 24. The arcuate notch 20c is shaped to seat a split guide ring 28 as described below. The distal edge 20a further includes a generally flat inner portion 26 extending inwardly immediately adjacent to notch 20c. The inner portion 26 extends at an angle to meet the central ring 22 which is recessed inwardly from the outer portions 24. Preferably, the blades 20 curve backwards with respect to the normal clockwise rotation of the impeller 12. This gives the fluid additional acceleration and energy immediately prior to it leaving the impeller 12 and entering the turbine 14.

As perhaps best illustrated in FIG. 4, the split guide ring 28 is seated within notches 20c, and resembles a hollow ring cut along a plane perpendicular to it axis. Preferably, the split guide ring 28 is formed integrally with the remainder of the upper member 12a. However, it may be manufactured separately and mounted to the upper member 12a during assembly.

The lower member 12b is similar to the upper member 12a, and includes a plurality of radially symmetric curved blades 30 or vanes extending radially outward from a central ring 32. However, in the lower assembly 12b, the central ring 32 is recessed slightly farther from the plane defined by the outer portions 34 of the blades 30. This design allows the outer portions 34 and 24 of both members 12a and 12b to lie along a single plane when the two central rings 32 and 22 are brought into abutting disposition. The blades 30 include distal and proximate edges 30a and 30b that are substantially identical in shape to the blades of the upper member 12a. An arcuate notch 31 is formed in the digital edge 30a of each blade to receive the split guide ring 28.

Similar to central ring 22, central ring 32 preferably includes a plurality of mounting holes 36 for intersecuring the upper and lower members 12a and 12b by conventional fasteners, such as rivets 38. Alternatively, the mounting holes 36 may be eliminated from both the upper and lower members, and the two elements may be joined by welding.

The turbine 14 is generally identical to the impeller 12 in both shape and design. However, the turbine 14 preferably includes several more blades than the impeller 12 to increase the efficiency of the torque converter 10. In addition, the turbine 14 is not mounted directly to the housing 18, but rather, includes its own cover 70. The configuration of the cover 70 will be described below.

The turbine 14 generally includes upper and lower members 14a and 14b each of which include a plurality of blades, 44 and 46 respectively. The blades 44 and 46 extend from central rings 48 and 50, respectively, and nest during assembly. The blades 44 and 46 of the turbine 14 are of the same basic construction as the blades 20 of the impeller 12, and include distal 44a, 46a and proximate 44b, 46b edges. The distal edges 44a, 46a generally include a flat outer portion 52 extending substantially perpendicular to the axis of the central ring 48, an arcuate notch 45, and a generally flat inner portion 53 extending at an angle to outer portion 52.

As with the impeller 12, the central ring 50 of the lower member 14b is recessed slightly farther than the central ring 48 of the upper member 14a. As noted above, this allows the blades 44, 46 to properly align during assembly. Preferably, central ring 48 and central ring 50 each include a plurality of mounting holes 51 for intersecuring the upper and lower members 14a and 14b by conventional fasteners, such as rivets.

Figure 5:
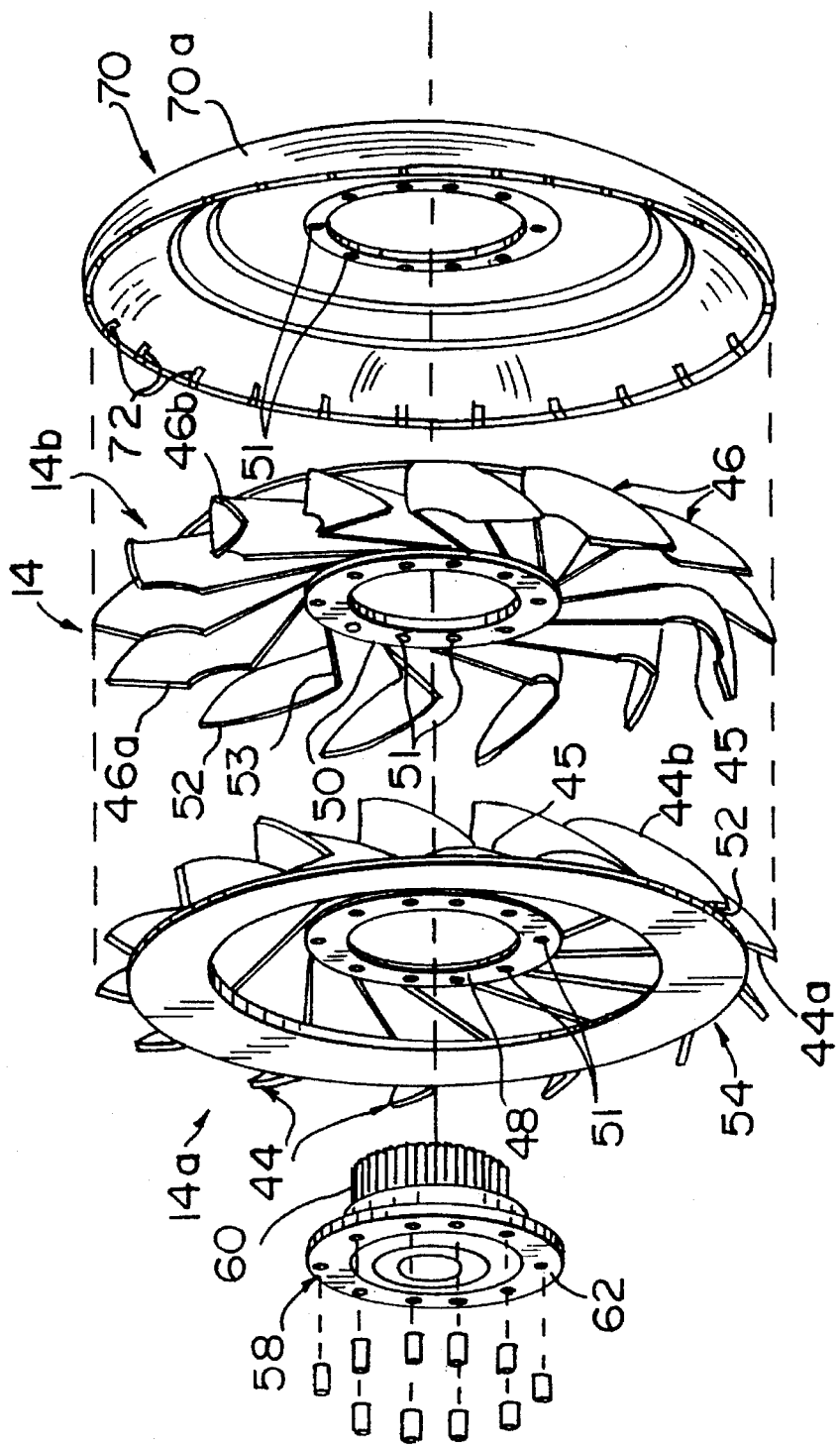
FIG. 5 is an exploded perspective view of the turbine of the present invention.

Referring now to FIG. 5, a split guide ring 54 is preferably seated within notches 45 formed in the upper member 14a. Once assembled, the split guide rings 54 also fits within the notches 45 of the lower member 14b. Split guide ring 54 is generally identical to split guide ring 28 described above in connection with the impeller 12.

As illustrated in FIG. 5, a center hub 58 is mounted within the center of the turbine 14. The center hub 58 generally includes a circumferential wall 60 extending from a mounting ring 62. The circumferential wall 60 is grooved along its inner surface to allow the turbine 14 to spline directly to the input shaft of the transmission.

Referring now to FIG. 5, cover 70 is a bowl-shaped structure having a curved sidewall 70a that substantially follows the contour of the proximate edges 44b, 46b of the turbine blades 44, 46. An opening is formed in a central portion of the cover to allow the center hub 58 to extend therethrough. The inside peripheral edge of the cover 70 is notched to receive the blades 44, 46. The notches 72 correspond in number to the blades 44, 46 and extend approximately half-way through the sidewall 70a. The turbine 14 is secured to the cover 70 by conventional means, such as welding or fasteners.

Figure 6:
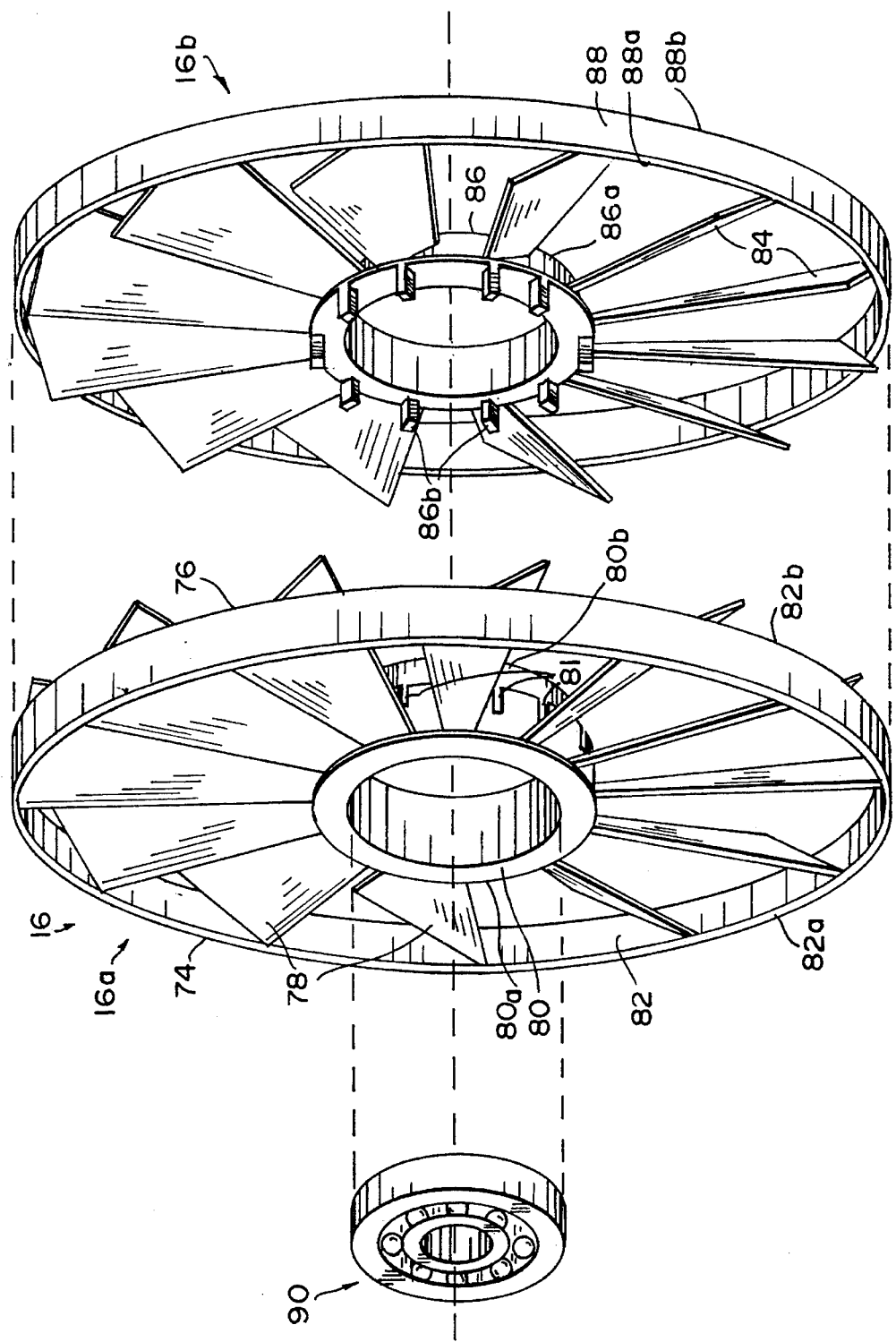
FIG. 6 is an exploded perspective view of the stator of the present invention.

The stator 16 is positioned between impeller 12 and the turbine 14. As shown in FIG. 2, the stator 16 is constructed to fit within the void defined between the blades of the impeller and turbine. Referring now to FIG. 6, the stator 16 is comprised of interlocking upper and lower members 16a and 16b. The upper member 16a includes top and bottom surfaces 74 and 76, and a plurality of blades 78 extending between inner and outer rings 80 and 82. The uppermost extent of each blade 78 aligns with the top surface 82a of outer ring 82. However, the lowermost extent of each blade 78 extends beyond the bottom surface 82b of outer ring 82 to align with the bottom surface 88b of outer ring 88 upon assembly. Preferably, the blades 78 narrow as they extend radially inward toward the inner ring 80. Inner ring 80 includes a circumferential wall having a full diameter portion 80a and a reduced diameter portion 80b. The full diameter portion 80a includes a plurality of radially symmetric notches 81 adapted to receive fingers 86b extending upwardly from inner ring 86. The reduced diameter portion 80b is adapted to fit within inner ring 86.

The lower member 16b is a near mirror image of the upper member 16a. The lower member 16b generally includes a plurality of blades 84 extending between inner and outer rings 86 and 88. The lowermost extent of each blade 84 aligns with the bottom surface 88b of outer ring 88, while the uppermost extent extends above the top surface 88a to align with the top surface 82a of outer ring 82. The inner ring 86 includes a circumferential wall 86a having a plurality of radially symmetric fingers 86b extending upwardly therefrom. The circumferential wall 86a is dimensioned to receive the reduced diameter portion 80b of inner ring 80. The upper and lower members 16a and 16b are intersecured by conventional means, such as welding.

Preferably, a conventional one-way roller clutch 90 fits within inner rings 80, 86. The roller clutch 90 is splined directly to the stator shaft 92 and allows the stator 16 to rotate in only a single direction.

Referring now to FIG. 3, the impeller 12, turbine 14, and stator 16 are preferably contained within a cast aluminum housing 18. Alternatively, a stamped steel or cast iron housing may be used. As noted above, the impeller 12 preferably mounts directly to the housing 18 by conventional means, such as fasteners or welding. The housing 18 is generally formed by first and second mating halves 18a and 18b. Both halves 18a and 18b are generally bowl-shaped and include a curved sidewall adapted to follow the curvature of the impeller 12 and turbine 14, respectively. The two halves 18a and 18b are intersecured by conventional means, such as fasteners or welding. A pilot hub 55 extends from the center of the second half 18b. The pilot hub 55 provides a circular recess in the interior of the housing 18 for seating a conventional bearing or bushing assembly (not shown) to pilot the input shaft of the transmission.

A conventional oil pump drive hub 40 extends from a central portion of the first half 18a. As the name implies, the oil pump drive hub 40 operates to drive the oil pump (not shown). An opening 42 extends through the center of the oil pump drive hub 40 to allow the transmission input shaft to enter the housing 18 and spline directly to the turbine 14, as will be described in greater detail below.

As perhaps best illustrated in FIG. 2, a flex plate 56 links the crankshaft to the second half 18b of the housing 18 so that rotation of the crankshaft is transferred directly to the housing 18.

MANUFACTURE AND ASSEMBLY

In the preferred embodiment, each of the upper and lower members are individually manufactured by die casting. Die casting is possible because each member includes only every other blade. The precise shape and configuration of the blades is limited only by the constraints of the technology.

After manufacture, mounting holes 23, 36 and 51 are formed in the center rings of the upper and lower members of the impeller 12 and turbine 14. The mounting holes are located such that when aligned during assembly the blades of the upper member are disposed midway between the blades of the lower member.

The impeller is assembled by riveting the upper and lower members to the interior of the first half 18a of the housing 18 through the mounting holes 23, 36, and 51.

The turbine is assembled by inserting the outer tips of each blade 44 and 46 into notches 72 in cover 70 and aligning the mounting holes of the center hub 58 with the mounting holes of the upper and lower members 14a and 14b and cover 70 and riveting the four elements together. Alternatively, the cover 70 may be adapted to rivet to the assembly of center hub 58 and upper and lower members 14a and 14b.

The stator 16 is assembled by interlocking the upper and lower members 16a and 16b by inserting fingers 86b into notches 81. The upper and lower members 16a and 16b are then intersecured, preferably by welding.

Next, a bearing or bushing assembly (not shown) is fit within the pilot hub 55. The bearing or bushing assembly is grooved to receive the splined end of the input shaft of the transmission. Subsequently, the two halves of the housing 18a and 18b are brought together around the stator 16 and turbine 14, and intersecured by conventional means, such as welding or fasteners. The stator 16 is positioned between the impeller 12 and turbine 14 as shown in FIG. 2. As in a conventional torque converter, the interior of the housing 18 is filled with automatic transmission fluid which is supplied and maintained by the transmission's hydraulic system.

To install the present invention on a conventional automobile, the torque converter 10 is fit over the stator shaft and input shaft 15 of the transmission (See FIG. 2). The stator 16 is splined to the stator shaft 11 which typically remains stationary during operation. In addition, the turbine 14 is splined to the input shaft 15 of the transmission so that, as described above, rotation of the turbine 14 is transferred directly to the transmission. Further, the torque converter 10 is linked to the crankshaft 13 by flex plate 56 which is bolted to both the housing 18 and the crankshaft 13.

In the preferred embodiment, the torque converter components 12, 14, and 16 are each an assembly of two separate members. However, it should be readily apparent that the number of members may be increased as necessary to provide the desired blade configuration. For example, each component may include an assembly of three members. In this alternative embodiment, each of the three members includes radially symmetric blades spaced apart three times the distance desired in the assembled component. When the three members are properly aligned, the blades nest to provide the desired configuration.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A torque converter, comprising:

an impeller;

a turbine;

a die cast stator having blades with inner and outer ends, and an integral, die cast outer ring connected to said outer ends of said blades; and a housing for enclosing said impeller, turbine, and stator, at least one of said impeller, turbine, and stator having interconnected upper and lower members, each of said upper and lower members being die cast and including a plurality of integral blades whereby said upper and lower members cooperate to define a desired blade configuration, said blades each including a notch, said upper and lower members including an integral, die cast guide ring, said guide ring extending concentrically around said one member within said notches and being integrally connected to said blades of said one member.

2. The torque converter of claim 1, wherein said blades of each of said upper and lower members are radially symmetric at a first spaced apart distance, said upper and lower members interconnecting such that said blades of said upper member are disposed midway between said blades of said lower member.

3. The torque converter of claim 2, wherein said upper and said lower members each include a central ring disposed radially inward of said blades; and further comprising a fastening means for interconnecting said central rings.

4. The torque converter of claim 3, further comprising a cover mounted to said turbine, said cover being notched to receive said blades; and wherein said impeller is mounted directly to said housing.

5. The torque converter of claim 4, wherein said stator includes upper and lower stator members each having integral, die cast inner and outer rings, said inner rings connected to one another to interconnect said upper and lower stator members.

6. The torque converter of claim 5, wherein one of said inner rings includes a plurality of grooves and the other of said rings includes a plurality of fingers adapted to fit within said grooves.

7. The torque converter of claim 6, wherein said turbine further includes a center hub interconnected with at least one of said central rings.

8. A fluid clutch device, comprising:

a housing;

a fluid contained within said housing; and first and second components disposed within said housing for rotational movement about a common axis, said first and second components each having interlocking die cast upper and lower members, said upper and lower members each including a plurality of integral blades extending substantially radially outward from said axis whereby rotational movement of one of said components causes said fluid to circulate in turn causing the other of said components to rotate, said blades each including a notch, at least one of said upper and lower members including an integral, die cast guide ring extending concentrically around said one member within said notches and being integrally connected to said blades of said one member.

9. The fluid clutch device of claim 8, wherein said blades of each of said upper and lower members are radially symmetric at a first spaced apart distance, said upper and lower members interconnecting such that said blades of said upper member nest midway between said blades of said lower member.

10. The fluid clutch device of claim 9, wherein said upper and said lower members each include a central ring disposed radially inward of said blades; and further comprising a fastening means for interconnecting said central rings.

11. The fluid clutch device of claim 10, further comprising a cover mounted to one of said components, said cover being notched to receive said blades; and wherein the other of said components is mounted directly to said housing.

12. The fluid clutch device of claim 11, further comprising a center hub mounted to said component having said cover mounted thereto.

13. A method for producing a fluid clutch device, comprising:

die casting upper and lower first component members each having a plurality of integral blades, the blades each including a notch, the upper member of the first component including an integral, die cast guide ring extending concentrically around the upper member within the notches;

interlocking the upper and lower first component members with the blades of each in nesting disposition;

die casting upper and lower second component members each having a plurality of integral blades, the blades each including a notch, the upper member of the second component including an integral, die cast guide ring extending concentrically around the upper member within the notches;

interlocking the upper and lower second component members with the blades of each in nesting disposition;

concentrically mounting the first and second components within a sealed housing filled with a fluid.

14. The method of claim 13, further comprising mounting said first component directly to said housing.

15. The method of claim 14, wherein the blades of the upper and lower members of the first and second components are radially symmetric.

16. The method of claim 15, wherein said step of interlocking upper and lower first component members includes concentrically aligning the upper and lower first component members such that the blades of the upper first component member nest midway between the blades of the lower first component member.

17. The method of claim 16, wherein said step of interlocking upper and lower second component members includes concentrically aligning the upper and lower second component members such that the blades of the upper second component member nest midway between the blades of the lower second component member.

18. The method of claim 17, further comprising:

die casting upper and lower third component members each having a plurality of integral, die cast blades extending between integral, die cast inner and outer rings;

interlocking the upper and lower third component members with the blades of each in nesting disposition; and mounting said third component within the housing between the first and second components.

19. The method of claim 18, wherein the step of die casting upper and lower third component members includes forming at least one notch in one of the upper or lower third component members and at least one finger in the other.

20. A method for producing a die cast component having closely spaced radially extending blades, comprising the steps of:

die casting an upper member having a plurality of integral radially symmetric blades extending outwardly from an integral central ring and an integral, die cast guide ring extending concentrically around said upper member;

die casting a lower member having a plurality of radially symmetric blades extending outwardly from a central ring; and interconnecting said upper and lower members such that said blades of said upper and lower members nest to form the bladed component.

21. The method of claim 20, wherein the blades of the upper and lower members are radially symmetric and disposed about a central axis at a first spaced apart distance; and wherein said interconnecting step is further defined as:

aligning the upper and lower members such that the central rings abut with one another and the blades of the upper member are disposed midway between the blades of the lower member; and securing the upper and lower members to one another to form a bladed component having radially symmetric blades spaced apart one half of the first spaced apart distance.

* * * * *